US011933678B2

(12) United States Patent
Mao et al.

(10) Patent No.: US 11,933,678 B2
(45) Date of Patent: Mar. 19, 2024

(54) TEMPERATURE SENSOR CALIBRATION USING RECURRENT NETWORK

(71) Applicant: Johnson Controls Technology Company, Auburn Hills, MI (US)

(72) Inventors: Bing Mao, Buffalo Grove, IL (US); Wensu Lu, Buffalo Grove, IL (US); Xiaoying Lu, Beijing (CN); Yingchun Xu, Glendale, WI (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 1241 days.

(21) Appl. No.: 16/361,931

(22) Filed: Mar. 22, 2019

(65) Prior Publication Data

US 2019/0293494 A1    Sep. 26, 2019

Related U.S. Application Data

(60) Provisional application No. 62/647,061, filed on Mar. 23, 2018.

(51) Int. Cl.
*G01K 3/06* (2006.01)
*G01K 3/04* (2006.01)

(52) U.S. Cl.
CPC .............. *G01K 3/06* (2013.01); *G01K 3/04* (2013.01)

(58) Field of Classification Search
CPC .......... G01K 3/06; G01K 3/04; G01K 15/005; G01K 7/427; G01K 1/20
See application file for complete search history.

(56) References Cited

U.S. PATENT DOCUMENTS

| 9,964,328 | B2 | 5/2018 | Ribbich et al. | |
|---|---|---|---|---|
| 10,317,862 | B2 * | 6/2019 | Ajax | ........................ F24F 3/044 |
| 10,514,308 | B2 * | 12/2019 | Jang | ........................ G01K 13/00 |
| 11,067,306 | B1 * | 7/2021 | Jaber | ........................ F24F 11/49 |
| 2002/0053555 | A1 * | 5/2002 | Matsuyama | ........... B23K 11/257 |
| | | | | 219/110 |

(Continued)

FOREIGN PATENT DOCUMENTS

| CN | 101067828 A | 11/2007 |
|---|---|---|
| CN | 105757882 A | 7/2016 |
| CN | 107063509 A | 8/2017 |

OTHER PUBLICATIONS

First Office Action for Chinese Application No. Cn 201910217353.X dated Aug. 14, 2020, 5 pages.

*Primary Examiner* — John E Breene
*Assistant Examiner* — Yaritza H Perez Bermudez
(74) *Attorney, Agent, or Firm* — Foley & Lardner LLP

(57) ABSTRACT

A method for determining ambient temperature of a device in a building control system. The method includes obtaining a measurement of ambient temperature from a first temperature sensor of the device and obtaining a measurement of temperature of a processing circuit of the device. These temperature measurements along with a brightness level of a display of the device and a state of a relay of the device are provided as input to a neural network. The neural network is trained to recognize these inputs in order to more accurately determine the ambient temperature of the device. The reading from the first temperature sensor may otherwise be inaccurate due to heat generated by electronic components of the device.

20 Claims, 6 Drawing Sheets

(56) References Cited

U.S. PATENT DOCUMENTS

| | | | |
|---|---|---|---|
| 2003/0160104 A1* | 8/2003 | Kelly | B60H 1/00807 236/91 C |
| 2006/0046114 A1* | 3/2006 | Kato | H01M 8/04089 429/444 |
| 2006/0195229 A1* | 8/2006 | Bell | H02J 3/00 700/286 |
| 2007/0200004 A1* | 8/2007 | Kasper | F24F 11/30 236/44 C |
| 2013/0226460 A1 | 8/2013 | Wu | |
| 2015/0167999 A1* | 6/2015 | Seem | F24F 11/30 700/276 |
| 2016/0231755 A1* | 8/2016 | Ajax | F24F 11/30 |
| 2017/0023272 A1* | 1/2017 | Erickson | G05B 15/02 |
| 2018/0189638 A1* | 7/2018 | Nurvitadhi | G06N 3/063 |
| 2018/0285734 A1* | 10/2018 | Chen | G06N 3/0445 |
| 2018/0307950 A1* | 10/2018 | Nealis | G06N 3/063 |
| 2018/0314926 A1* | 11/2018 | Schwartz | G06N 3/084 |
| 2018/0322385 A1* | 11/2018 | Yehezkel Rohekar | G06N 7/005 |
| 2019/0024922 A1 | 1/2019 | Erickson et al. | |
| 2019/0102678 A1* | 4/2019 | Chang | G06K 9/627 |
| 2019/0188568 A1* | 6/2019 | Keskar | G06N 3/0445 |
| 2019/0277525 A1* | 9/2019 | Ajax | F24F 11/58 |
| 2020/0080744 A1* | 3/2020 | Sohn | G06N 3/08 |

* cited by examiner

TEMPERATURE SENSOR CALIBRATION USING RECURRENT NETWORK

CROSS-REFERENCE TO RELATED PATENT APPLICATION

This application claims the benefit of and priority to U.S. Provisional Patent Application No. 62/647,061 filed Mar. 23, 2018, the entire disclosure of which is incorporated by reference herein.

BACKGROUND

The present disclosure relates generally to devices for use in building control systems. Such devices rely on accurate measurements and sensor readings in order to efficiently and effectively control building systems such as HVAC systems. These devices can include powerful chipsets, advanced displays, and/or other components that consume significant amounts of power and generate heat. For example, a touch-sensitive thermostat device with an LCD screen may be used to control the temperature of a building space. The heat generated by these components may cause errors in sensor readings such as temperature readings. It is generally desired to have a method of correcting inaccuracies that result from this phenomenon.

SUMMARY

One implementation of the present disclosure is a method for determining ambient temperature of a device in a building control system. The method includes obtaining a first temperature measurement from a first temperature sensor of the device. The first temperature sensor is configured to measure the ambient temperature. The method further includes obtaining a second temperature measurement from a second temperature sensor of the device. The second temperature sensor is configured to measure a temperature of a processing circuit of the device. The method further includes determining a brightness level associated with a display of the device and determining a state of a relay associated with the device. The state of the relay is indicative of a level of electrical energy powering the device. The method further includes providing the first temperature measurement, the second temperature measurement, the brightness level, and the state of the relay as input to a neural network and determining the ambient temperature based on an output of the neural network.

In some embodiments, the method further includes training the neural network with a time series dataset that includes the first temperature measurement, the second temperature measurement, the brightness level, the state of the relay, and a measurement of the ambient temperature generated by a third temperature sensor that is separate from the device.

In some embodiments, the method further includes determining, by the neural network, an internal heat index associated with the device using the second temperature measurement, the brightness level, and the state of the relay. The internal heat index includes an estimation of heat generated by electronic components of the device.

In some embodiments, determining the internal heat index includes determining a temperature of the display based on the brightness level and an amount of time since the brightness level has changed.

In some embodiments, determining the internal heat index further includes determining a temperature of the relay based on the state of the relay and an amount of time since the state of the relay has changed.

In some embodiments, the internal heat index is a weighted sum of the second temperature measurement, the temperature of the display, and the temperature of the relay.

In some embodiments, the output of the neural network is a weighted sum of the first temperature measurement and the internal heat index.

In some embodiments, the neural network is a recurrent neural network, and an activation function associated with at least one node in the neural network is a hyperbolic tangent function.

Another implementation of the present disclosure is a device in a building control system. The device includes a first temperature sensor configured to generate a first temperature measurement that is indicative of ambient temperature of the device, a relay configured to control an amount of electrical energy powering the device, a display configured to provide a user interface to a user of the device, and a processing circuit comprising a second temperature sensor configured to generate a second temperature measurement that is indicative of a temperature of the processing circuit. The processing circuit is configured to obtain the first temperature measurement from the first temperature sensor, obtain the second temperature measurement from the second temperature sensor, determine a brightness level associated with the display, and determine a state of the relay. The processing circuit is further configured to provide the first temperature measurement, the second temperature measurement, the brightness level, and the state of the relay as input to a neural network and determine the ambient temperature of the device based on an output of the neural network.

In some embodiments, the neural network is trained with a time series dataset including the first temperature measurement, the second temperature measurement, the brightness level, the state of the relay, and a measurement of the ambient temperature generated by a third temperature sensor that is separate from the device.

In some embodiments, the neural network is configured to determine an internal heat index associated with the device using the second temperature measurement, the brightness level, and the state of the relay. The internal heat index is an estimation of heat generated by electronic components of the device.

In some embodiments, the neural network is configured to determine a temperature of the display based on the brightness level and an amount of time since the brightness level has changed.

In some embodiments, the neural network is configured to determine a temperature of the relay based on the state of the relay and an amount of time since the state of the relay has changed.

In some embodiments, the internal heat index is a weighted sum of the second temperature measurement, the temperature of the display, and the temperature of the relay.

In some embodiments, the output of the neural network is a weighted sum of the first temperature measurement and the internal heat index.

In some embodiments, the neural network is a recurrent neural network and an activation function associated with at least one node in the neural network is a hyperbolic tangent function.

Yet another implementation of the present disclosure is a method for determining ambient temperature of a device in a building control system. The method includes obtaining a first temperature measurement from a first temperature sensor of the device. The first temperature sensor is configured to measure the ambient temperature. The method further includes obtaining a second temperature measurement from a second temperature sensor of the device. The second temperature sensor is configured to measure a temperature of a processing circuit of the device. The method further includes determining a brightness level associated with a display of the device. The method further includes providing the first temperature measurement, the second temperature measurement, the brightness level, and the state of the relay as input to a neural network and determining the ambient temperature based on an output of the neural network.

In some embodiments, the method further includes training the neural network with a time series dataset including the first temperature measurement, the second temperature measurement, the brightness level, and a measurement of the ambient temperature generated by a third temperature sensor that is separate from the device.

In some embodiments, the method further includes determining, by the neural network, an internal heat index associated with the device using the second temperature measurement and the brightness level. The internal heat index is an estimation of heat generated by electronic components of the device.

In some embodiments, the output of the neural network is a weighted sum of the first temperature measurement and the internal heat index.

DETAILED DESCRIPTION

Overview

Referring generally to the FIGURES, systems and methods for calibrating a temperature sensor using a recurrent neural network are shown, according to various exemplary embodiments. A thermostat device used to control heating or cooling of a building space may include components that generate significant amounts of heat. For example, a thermostat may include a touch-sensitive LCD display and a graphics processing unit (GPU) that consume large amounts of energy during peak periods of operation. The thermostat device may also include an ambient temperature sensor configured to measure the temperature of a building space. Excess heat generated by components of the thermostat may cause the ambient temperature sensor to provide inaccurate measurements and, in turn, cause inadequate heating or cooling of a building space. A recurrent neural network may be used to calibrate the ambient temperature sensor in order to provide the thermostat device with a more accurate temperature measurement.

Thermostat Device

Figure 1:
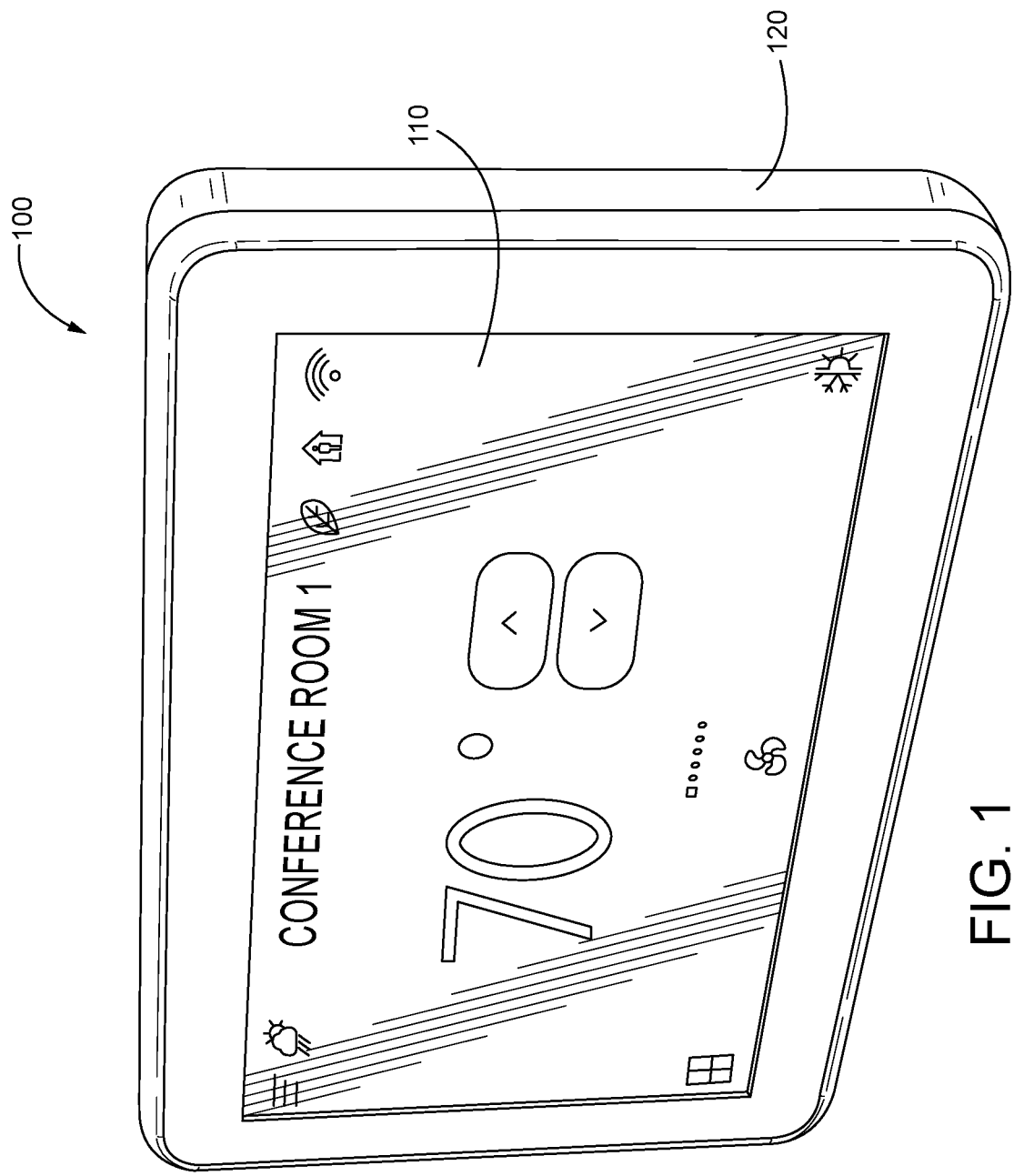
FIG. 1 is a perspective view of a thermostat device, according to some embodiments.

FIG. 1 is a drawing of a thermostat device 100 that includes a display 110 and processing electronics 120, according to some embodiments. The display 110 may be an interactive display that can display information and receive user input. Display 110 may be transparent such that a user can view information on the display as well as view the surface located behind the display. Thermostats with transparent and cantilevered displays are described in further detail in U.S. patent application Ser. No. 15/146,649 filed May 4, 2016, the entirety of which is incorporated by reference herein.

Display 110 can be a touchscreen or other type of electronic display configured to present information to a user in a visual format (e.g., as text, graphics, etc.) and receive input from a user (e.g., via a touch-sensitive panel). For example, the display 110 may include a touch-sensitive panel layered on top of an electronic visual display. A user can provide inputs through simple or multi-touch gestures by touching the display 110 with one or more fingers and/or with a stylus or pen. The display 110 can use any of a variety of touch-sensing technologies to receive user inputs, such as capacitive sensing (e.g., surface capacitance, projected capacitance, mutual capacitance, self-capacitance, etc.), resistive sensing, surface acoustic wave, infrared grid, infrared acrylic projection, optical imaging, dispersive signal technology, acoustic pulse recognition, and/or other touch-sensitive technologies. Many of these technologies allow for multi-touch responsiveness of display 110 allowing registration of touch in two or even more locations at once. The display may use any of a variety of display technologies such as light emitting diode (LED), organic light-emitting diode (OLED), liquid-crystal display (LCD), organic light-emitting transistor (OLET), surface-conduction electron-emitter display (SED), field emission display (FED), digital light processing (DLP), liquid crystal on silicon (LCoC), or any other display technologies known in the art. In some embodiments, the display 110 is configured to present visual media (e.g., text, graphics, etc.) without requiring a backlight.

Processing electronics 120 may be a combination of hardware and software configured to operate thermostat device 100. Electronics 120 may include a central processing unit (CPU) and a graphics processing unit (GPU). Electronics 120 may be configured to execute instructions stored on a memory local to the thermostat device 100 and/or receive instructions externally (e.g., via Wi-Fi, Bluetooth, LAN, WAN, etc). Electronics 120 may further include a power circuit configured to provide power to the thermostat device 100. The power circuit may include one or more electrical relays used to perform voltage transfers (e.g., 120V A/C to 5V D/C). Electronics 120 may also include a virtual software agent. In addition, some or all of electronics 120 can be configured using an Internet of Things (IoT) protocol allowing device 100 to send and receive data from a Building Management System, Building Automation System, and/or another higher-level control or analytics platform (e.g., cloud computing platform). Advanced components of electronics 120, such as a GPU, can be configured to generate high definition graphics and animations to be presented via display 110. These advanced components can provide users of thermostat device 100 with an improved user experience but may generate significant amounts of heat during peak operation.

Figure 2:
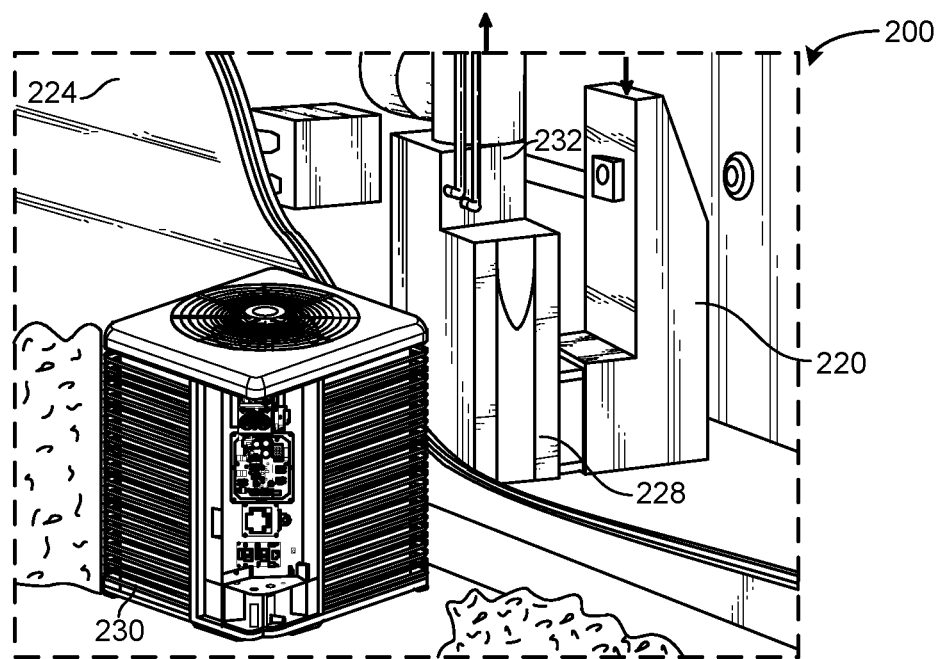
FIG. 2 is a drawing of a building equipped with a residential heating and cooling system that can be controlled by the thermostat of FIG. 1, according to some embodiments.

FIG. 2 is an illustration of a residential heating and cooling (HVAC) system 200 that may be controlled by thermostat device 100, according to some embodiments. The residential heating and cooling system 200 may provide heated and cooled air to a residential structure. In general, a residence 224 includes refrigerant conduits that operatively couple an indoor unit 228 to an outdoor unit 230. Indoor unit 228 may be positioned in a utility space, an attic, a basement, and so forth. Outdoor unit 230 is situated adjacent to a side of residence 224. Refrigerant conduits transfer refrigerant between indoor unit 228 and outdoor unit 230, typically transferring primarily liquid refrigerant in one direction and primarily vaporized refrigerant in an opposite direction.

If system 200 is operating as an air conditioner, a coil in outdoor unit 230 serves as a condenser for recondensing vaporized refrigerant flowing from indoor unit 228 to outdoor unit 230 via one of the refrigerant conduits. In such operations, a coil of the indoor unit 228, designated by the reference numeral 232, serves as an evaporator coil. Evaporator coil 232 receives liquid refrigerant (which may be expanded by an expansion device, not shown) and evaporates the refrigerant before returning it to outdoor unit 230.

Outdoor unit 230 draws in environmental air through its sides, forces the air through the outer unit coil using a fan, and expels the air. When operating as an air conditioner, the air is heated by the condenser coil within the outdoor unit 230 and exits the top of the unit at a temperature higher than it entered the sides. Air is blown over indoor coil 232 and is then circulated through residence 224 by means of ductwork 220, as indicated by the arrows entering and exiting ductwork 220. The overall system 200 operates to maintain a desired temperature as set by thermostat device 100. When the temperature sensed inside the residence 224 is higher than the set point on thermostat 100 (with the addition of a relatively small tolerance), the air conditioner will become operative to refrigerate additional air for circulation through the residence 224. When the temperature reaches the set point (with the removal of a relatively small tolerance), the unit can stop the refrigeration cycle temporarily.

In some embodiments, system 200 is configured so that outdoor unit 230 is controlled to achieve a more elegant control over temperature and humidity within the residence 224. The outdoor unit 230 is controlled to operate components within the outdoor unit 230, and the system 200, based on a percentage of a delta between a minimum operating value of the compressor and a maximum operating value of the compressor plus the minimum operating value. In some embodiments, the minimum operating value and the maximum operating value are based on the determined outdoor ambient temperature, and the percentage of the delta is based on a predefined temperature differential multiplier and one or more time dependent multipliers.

Figure 3:
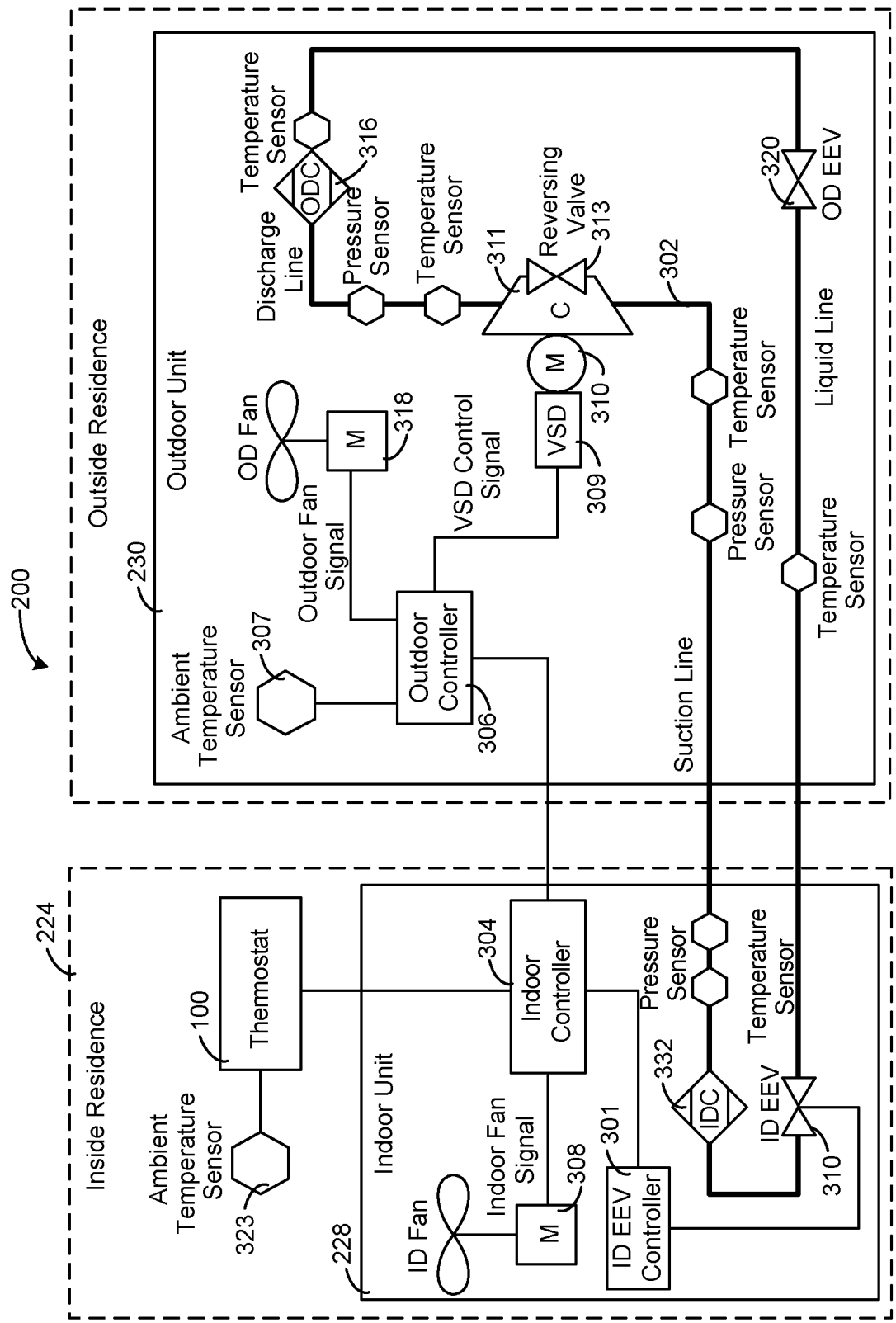
FIG. 3 is a schematic drawing of an indoor unit, an outdoor unit, and a refrigeration line of the heating and cooling system of FIG. 2, according to some embodiments.

Referring now to FIG. 3, a more detailed diagram of HVAC system 200 is shown, according to some embodiments. Various components of system 200 are located inside residence 224 while other components are located outside residence 224. Outdoor unit 230, as described above, may be located outside of residence 224. Alternatively, indoor unit 228 and thermostat 100 can be located inside of residence 224. Thermostat 100 may cause indoor unit 228 and outdoor unit 230 to heat or cool residence 224. Thermostat 100 may also command an airflow change within residence 224 to control humidity.

Thermostat device 100 can be configured to generate control signals for indoor unit 228 and/or outdoor unit 230. Thermostat 100 is shown to be connected to an indoor ambient temperature sensor 323. In some embodiments, sensor 323 may be a component of thermostat device 100. An outdoor unit controller 306 is shown to be connected to an outdoor ambient temperature sensor 307. The indoor ambient temperature sensor 323 and the outdoor ambient temperature sensor 307 may be any kind of temperature sensor (e.g., thermistor, thermocouple, etc.). Thermostat 100 may be configured to measure the temperature of residence 224 via the indoor ambient temperature sensor 323. Further, thermostat 100 can be configured to receive the temperature outside of residence 224 via communication with outdoor unit controller 306. In various embodiments, thermostat 100 generates control signals for indoor unit 228 and outdoor unit 230 based on the indoor ambient temperature (e.g., measured via indoor ambient temperature sensor 323), the outdoor temperature (e.g., measured via the outdoor ambient temperature sensor 307), and/or a temperature setpoint.

Indoor unit 228 and outdoor unit 230 may be electrically connected. Further, indoor unit 228 and outdoor unit 230 may be coupled via conduits 302. Outdoor unit 230 can be configured to compress refrigerant inside of conduits 302 to either heat or cool the building based on the operating mode of the indoor unit 228 and the outdoor unit 230 (e.g., heat pump operation or air conditioning operation). The refrigerant inside of conduits 302 may be any fluid that absorbs and extracts heat. For example, the refrigerant may be hydro fluorocarbon (HFC) based R-410A, R-407C, and/or R-134a.

Outdoor unit 230 is shown to include outdoor unit controller 306, a variable speed drive 309, a motor 310 and a compressor 311. Outdoor unit 230 can be configured to control compressor 311 and cause compressor 311 to compress the refrigerant inside conduits 302. In this regard, compressor 311 may be driven by the variable speed drive 309 and motor 310. For example, outdoor unit controller 306 can generate control signals for variable speed drive 309. Variable speed drive 309 (e.g., an inverter, a variable frequency drive, etc.) may be an AC-AC inverter, a DC-AC inverter, and/or any other type of inverter. Variable speed drive 309 can be configured to vary the torque and/or speed of motor 310 which, in turn, drives the speed and/or torque of compressor 311. Compressor 311 may be any suitable compressor such as a screw compressor, a reciprocating compressor, a rotary compressor, a swing link compressor, a scroll compressor, or a turbine compressor, etc.

In some embodiments, outdoor unit controller 306 is configured to process data received from the thermostat 100 to determine operating values for components of system 200 such as compressor 311. In some embodiments, outdoor unit controller 306 is configured to provide determined operating values for compressor 311 to variable speed drive 309 in order to control a speed of compressor 311. Outdoor unit controller 306 can be configured to operate components of both outdoor unit 230 and indoor unit 228 based on a percentage of a delta between a minimum operating value of the compressor and a maximum operating value of the compressor plus the minimum operating value. In some embodiments, the minimum operating value and the maximum operating value are based on the determined outdoor ambient temperature, and the percentage of the delta is based on a predefined temperature differential multiplier and one or more time-dependent multipliers.

In some embodiments, outdoor unit controller 306 controls a reversing valve 313 to operate system 200 as a heat pump or an air conditioner. For example, outdoor unit controller 306 may cause reversing valve 313 to direct compressed refrigerant to an indoor coil 332 while in heat pump mode and to an outdoor coil 316 while in air conditioner mode. In this regard, the indoor coil 332 and the outdoor coil 316 can both act as condensers and evaporators depending on the operating mode (i.e., heat pump or air conditioner) of system 200.

Further, in various embodiments, outdoor unit controller 306 can be configured to control and/or receive data from an outdoor electronic expansion valve (EEV) 320. The outdoor electronic expansion valve 320 may be an expansion valve controlled by a stepper motor. In this regard, outdoor unit controller 306 can be configured to generate a step signal (e.g., a PWM signal) for the outdoor electronic expansion valve 320. Based on the step signal, the outdoor electronic expansion valve 320 can be held fully open, fully closed, partially open, etc. In various embodiments, outdoor unit controller 306 can be configured to generate a step signal for outdoor electronic expansion valve 320 based on a subcool and/or superheat value calculated from various temperatures and pressures measured throughout system 200. In some embodiments, outdoor unit controller 306 is configured to control the position of the outdoor electronic expansion valve 320 based on a percentage of a delta between a minimum operating value of the compressor and a maximum operating value of the compressor plus the minimum operating value. In some embodiments, the minimum operating value and the maximum operating value are based on the determined outdoor ambient temperature, and the percentage of the delta is based on a predefined temperature differential multiplier and one or more time dependent multipliers.

Outdoor unit controller 306 can be configured to control and/or power outdoor fan 318. Outdoor fan 318 can be configured to blow air over outdoor coil 316. In this regard, outdoor unit controller 306 can control the amount of air blowing over outdoor coil 316 by generating control signals to control the speed and/or torque of outdoor fan 318. In some embodiments, the control signals are pulse wave modulated signals (PWM), analog voltage signals (i.e., varying the amplitude of a DC or AC signal), and/or any other type of signal. Outdoor unit controller 306 can control an operating value of outdoor fan 318, such as speed, based on a percentage of a delta between a minimum operating value of the compressor and a maximum operating value of the compressor plus the minimum operating value. In some embodiments, the minimum operating value and the maximum operating value are based on the determined outdoor ambient temperature, and the percentage of the delta is based on a predefined temperature differential multiplier and one or more time dependent multipliers.

Outdoor unit 230 may include one or more temperature sensors and one or more pressure sensors. The temperature sensors and pressure sensors may be electrically connected (e.g., via wires, via wireless communication, etc.) to outdoor unit controller 306. In this regard, outdoor unit controller 306 can be configured to measure and store temperatures and pressures of refrigerant at various locations within conduits 302. The pressure sensors may be any kind of transducer that can be configured to sense the pressure of the refrigerant in the conduits 302. For example, a pressure sensor within may be used to measure the pressure of refrigerant in conduits 302 in the suction line (i.e., a predefined distance from the inlet of compressor 311). A pressure sensor may also be used to measure the pressure of the refrigerant in conduits 302 on the discharge line (e.g., a predefined distance from the outlet of compressor 311).

The temperature sensors of outdoor unit 230 may include thermistors, thermocouples, and/or any other temperature sensing device. Outdoor unit 230 is shown to include temperature a variety of temperature sensors that can be configured to measure the temperature of the refrigerant at various locations inside conduits 302.

Indoor unit 228 is shown to include an indoor unit controller 304, an indoor electronic expansion valve controller 301, an indoor fan 308, an indoor coil 332, an indoor electronic expansion valve 310, a temperature sensor, and a pressure sensor. Indoor unit controller 304 can be configured to generate control signals for indoor electronic expansion valve controller 301. The signals may be setpoints such as a temperature setpoint, a pressure setpoint, a superheat setpoint, a subcool setpoint, and/or a step value setpoint. In this regard, indoor electronic expansion valve controller 301 can be configured to generate control signals for indoor electronic expansion valve 310. Indoor electronic expansion valve 310 may be the same type of valve as outdoor electronic expansion valve 320. In this regard, indoor electronic expansion valve controller 301 can be configured to generate a step control signal (e.g., a PWM wave) for controlling the stepper motor of the indoor electronic expansion valve 310. In this regard, indoor electronic expansion valve controller 301 can be configured to fully open, fully close, or partially close the indoor electronic expansion valve 310 based on the step signal.

Indoor unit controller 304 can be configured to control indoor fan 308. Indoor fan 308 can be configured to blow air over indoor coil 332. In this regard, indoor unit controller 304 can control the amount of air blowing over the indoor coil 332 by generating control signals to control the speed and/or torque of the indoor fan 308. In some embodiments, the control signals are pulse wave modulated signals (PWM), analog voltage signals (i.e., varying the amplitude of a DC or AC signal), and/or any other type of signal. In one embodiment, the indoor unit controller 304 may receive a signal from outdoor unit controller 306 indicating one or more operating values such as speed for the indoor fan 308. In some embodiments, the operating value associated with the indoor fan 308 is an airflow such as cubic feet per minute (CFM). Outdoor unit controller 306 may determine the operating value of indoor fan 308 based on a percentage of a delta between a minimum operating value of the compressor and a maximum operating value of the compressor plus the minimum operating value. In some embodiments, the minimum operating value and the maximum operating value are based on the determined outdoor ambient temperature, and the percentage of the delta is based on a predefined temperature differential multiplier and one or more time dependent multipliers.

Indoor unit controller 304 may be electrically connected (e.g., wired connection, wireless connection, etc.) to a pressure sensor and/or temperature sensor of indoor unit 228. In this regard, indoor unit controller 304 can receive pressure and/or temperature measurements from the suction line (i.e., a predefined distance from indoor coil 332) or the liquid line (i.e., a predefined distance from indoor coil 332) in order to adjust various operating parameters.

It should be noted that thermostat device 100 can be used in a variety of building control systems. Although a residential heating and cooling system 200 is described above, thermostat device 100 can also be used in a variety of other applications including commercial HVAC units (e.g., roof top units). For example, an HVAC system for a large building or building campus (e.g., school, office building) may use one or more thermostat devices 100 to control one or more building spaces.

Temperature Sensor Calibration Using Recurrent Network

A recurrent neural network is used to calibrate an ambient temperature sensor (e.g., sensor 323) of a thermostat or other device (e.g., thermostat device 100) in some embodiments. In some embodiments, machine learning is used to avoid the need for specific programming. Any of a variety of dynamic machine learning algorithms can be used to make data-driven predictions as opposed to solely following static instructions. The neural network (e.g., a type of machine learning algorithm) is employed and structures computations as an interconnected group of artificial neurons (similar to a biological neural network) in some embodiments. The neural network models complex relationships between inputs and outputs of thermostat device 100 in order to make predictions about data in some embodiments. The neural network is employed as a data modeling tool and uses approaches such as joint probability distribution to discover data patterns in some embodiments. Approaches such as gradient descent and logistic regression are used to generate and minimize an error function in some embodiments. A recurrent neural network is used to process dynamic temporal behavior in some embodiments. The recurrent neural network can be configured to process an arbitrary sequence of inputs, such as temperature inputs from different sensors or temperature sensor inputs at defined time intervals in some embodiments. As opposed to feed forward neural networks, a recurrent neural network is employed to provide a directed cycle in the sense that an output from one or more nodes may also be used as an input to one or more nodes in some embodiments.

Figure 4:
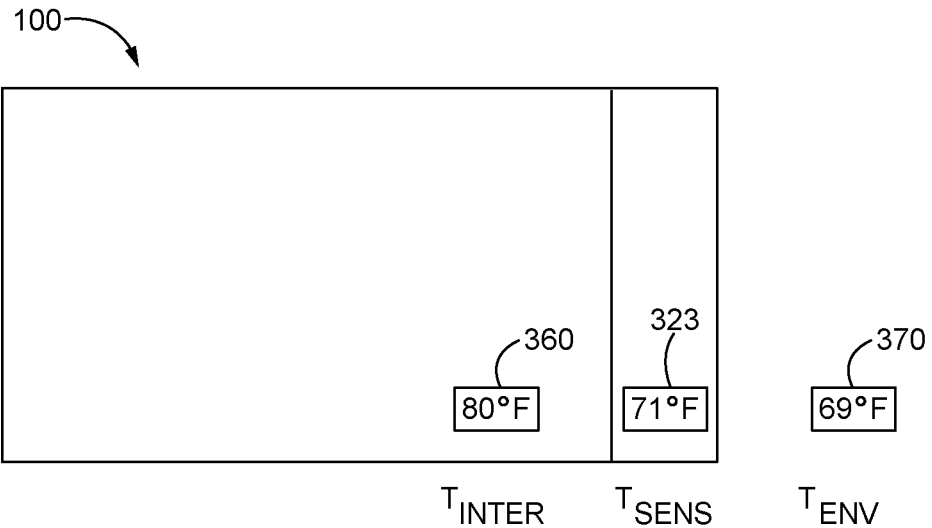
FIG. 4 is a model of the thermostat device of FIG. 1, according to some embodiments.

Referring now to FIG. 4, a model of thermostat device 100 is shown, according to some embodiments. In some embodiments, thermostat device 100 uses an ambient temperature sensor 323 in order to obtain a temperature measurement of the surrounding environment. For example, if thermostat device 100 is deployed in a residence, it can use sensor 323 to measure the temperature of the residence. The ability to minimize error in temperature measurements obtained by sensor 323 is essential for proper operation of thermostat device 100. For example, if a user sets thermostat 100 to a temperature of 74° F., but the reading from sensor 323 indicates an ambient temperature of 72° F., thermostat device 100 can send control signals to provide heat. If sensor 323 indicates an ambient temperature of 75° F., but the actual ambient temperature is 72° F., thermostat 100 may not send control signals to provide heat even though it should.

The model shown in FIG. 4 illustrates three points: the actual ambient temperature 370 (e.g., 69° F.), the temperature measured by sensor 323 (e.g., 71° F.), and an internal temperature 360 generated by electronic components of thermostat device 100 (e.g., 80° F.). During operation, components of device 100 such as display 110 and electronics 120 may generate excess heat. In some embodiments, this excess heat is modeled as internal temperature 360 and may cause the reading from temperature sensor 323 to involve significant error when compared to actual temperature 370 of a surrounding environment. It may be assumed that internal temperature 360 and the measured temperature from sensor 323 have a linear relationship and have weighted contributions to an approximation of actual temperature 370. In some embodiments, this model is represented by the equation $T_{env}=a*T_{inter}+b*T_{sens}$. In addition, a change in temperature 360 or 370 can create a change in temperature 323 according to the model $\Delta T_{sens}=c*((T_{env}-a*T_{inter})/b-T_{sens})$, where the coefficient c represents the moving speed of $T_{sens}$. In some embodiments, the best values for coefficients a, b, and c are determined by a recurrent neural network.

Figure 5:
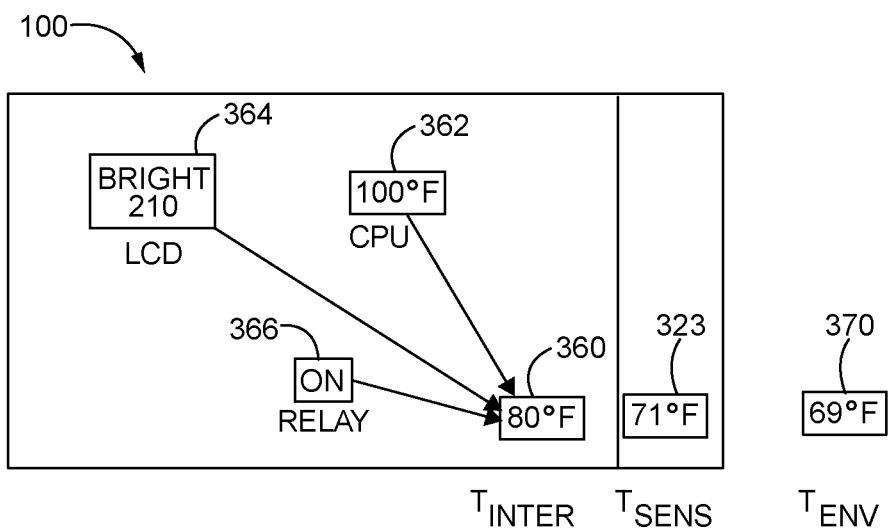
FIG. 5 is another model of the thermostat device of FIG. 1, according to some embodiments.

Referring now to FIG. 5, another model of thermostat device 100 is shown, according to some embodiments. FIG. 5 depicts three main contributions to internal temperature 360: heat generated by the CPU, heat generated by the display, and heat generated by a relay of the power circuit. In some embodiments, CPU temperature 362 (e.g., 100° F.) is a reading from a predetermined temperature sensor on the CPU. As mentioned above, the CPU may include a GPU that generates graphics to be presented via display 110. During periods of peak activity, the CPU and GPU can generate significant amounts of heat. Display temperature 364 is calculated based on a brightness setting for display 110 (e.g., 0-255) in some embodiments. The brightness setting may be at or near zero while the device is not in use (e.g., sleep mode) but may be increased when a user provides input such as changing a temperature setting or interacting with a virtual assistant. As mentioned above, display 110 may be an LCD display or another type of display. Relay temperature 366 may be calculated based on a current state (i.e., on/off) of one or more relays of a power circuit for device 100. A relay in the "on" state can signify high power consumption. Depending how long the relay has been in the "on" state, a significant amount of heat may be generated within thermostat device 100. Each of these three contributions to internal temperature 360 of thermostat device 100 may be more or less significant than others depending on the application. In some embodiments, this relationship is modeled by the equation $T_{inter}=d*T_{cpu}+e*T_{lcd}+f*T_{relay}$. A recurrent neural network may be designed and trained in order to determine the best values for coefficients d, e, and f.

Figure 6:
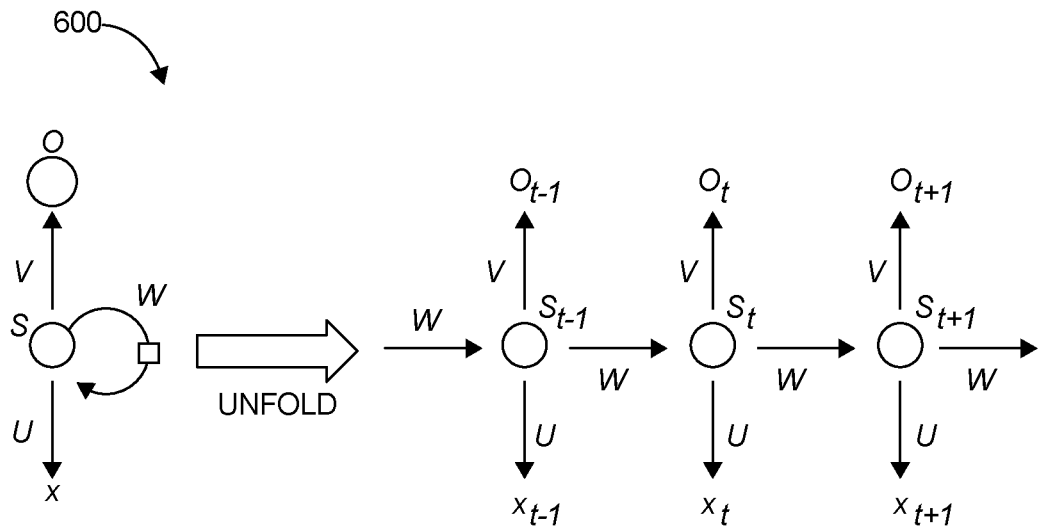
FIG. 6 is an illustration of a recurrent neural network design principle, according to some embodiments.

Referring now to FIG. 6, an illustration 600 of a recurrent neural network design principle is shown, according to some embodiments. Illustration 600 depicts the "unfolding" of a node in a recurrent neural network. The variable $x_t$ represents an input at time t and the variable $s_t$ represents a hidden state at time t. The current hidden state ($s_t$) is calculated based on the previous hidden state ($s_{t-1}$) and the input ($x_t$). Weights may be applied to the input ($x_t$), hidden state ($s_t$), and output ($o_t$) at each stage in time (i.e., weights U, W, and V). The recurrent neural network is trained in order to determine the best value for weights in the network by using a back propagation through time (BPTT) algorithm in some embodiments. A recurrent neural network is advantageous for use with thermostat device 100 because knowledge of previous states (e.g., display temperature at last time step) can be leveraged in order to make a more accurate prediction of ambient temperature. The functionality shown in illustration 600 demonstrates the concept of "memory" within a recurrent neural network. This "memory" can store valuable information allowing the network to make data-driven predictions.

Figure 7:
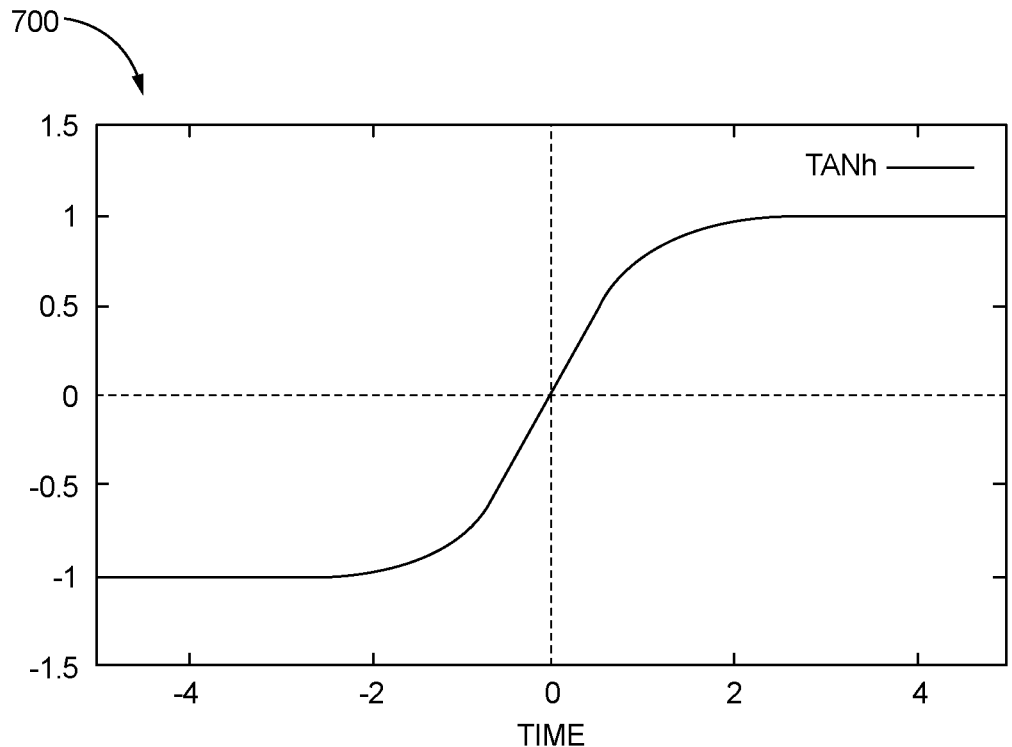
FIG. 7 is another illustration of a recurrent neural network design principle, according to some embodiments.

Referring now to FIG. 7, an illustration 700 of another recurrent neural network design principle is shown, according to some embodiments. Graph 700 depicts an example of an activation function that can be used in a recurrent neural network. In some embodiments, an activation function of a node in a neural network defines the output of the node when given a set of inputs. For example, all of the inputs at a given node may be summed, then the activation function may be applied to the sum of the inputs in order to generate an output for the node. In some embodiments, the activation function is a hyperbolic tangent function. Similar to a sigmoid, the hyperbolic tangent function provides an "S"- shaped graph that is nonlinear with an output ranging from −1 to 1. The hyperbolic tangent function is monotonic and provides a straightforward derivative that can be used to calculate parameter gradients in some embodiments. The ability to calculate derivatives in this manner can provide a neural network with the ability to minimize an error function in some embodiments. As an example, a node in a recurrent neural network used to estimate display temperature 364 may be modeled by the equation $T_{lcd}=(T_{new}-T_{old})*\tanh(\text{tick}*g)+T_{old}$. In this equation, the value of tick can be reset each time the brightness level of display 110 is changed and the best value for the coefficient g can be determined by a recurrent neural network in some embodiments.

Figure 8:
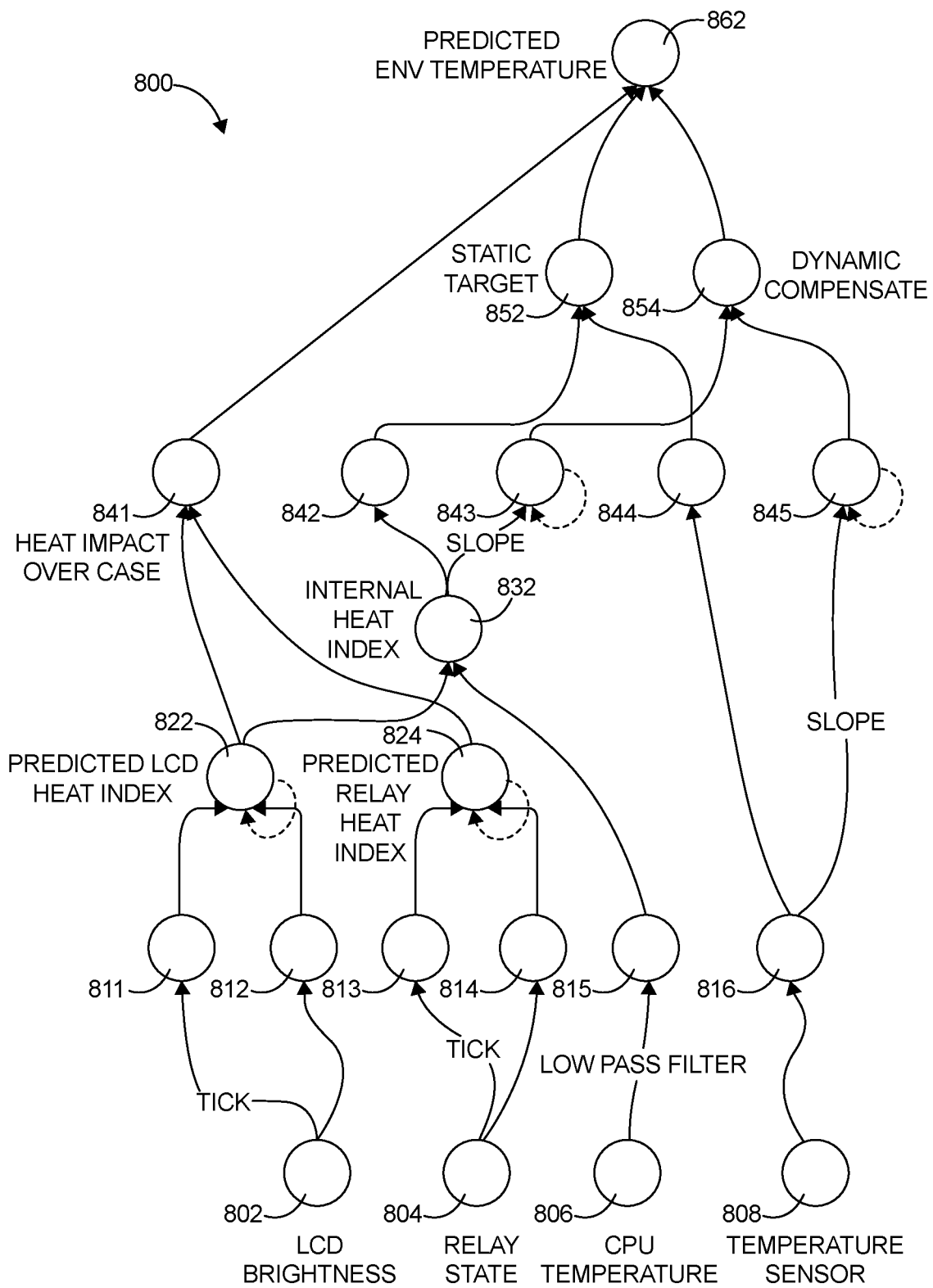
FIG. 8 is a diagram of a recurrent neural network model that can be implemented in the thermostat of FIG. 1, according to some embodiments.

Referring now to FIG. 8, an example neural network model 800 is shown, according to some embodiments. Recurrent neural network 800 can be used by thermostat device 100 to calibrate an ambient temperature sensor (e.g., sensor 323) and predict ambient temperature. For example, a thermostat device 100 deployed in a residential building space (e.g., house, apartment, etc.) may use network 800 to predict the actual temperature of the residence at any given point in time. Network 800 can be implemented using a connection to one or more remote servers (e.g., cloud-based) or can be hosted on device 100 itself, or a combination thereof. As discussed above, excess heat generated by various components of thermostat device 100 may introduce significant error in ambient temperature measurements taken by an ambient temperature sensor of device 100. Network 800 can be implemented in thermostat device 100 in order to automatically calibrate and reduce error in ambient temperature measurements. It should be noted that the network model 800 shown in FIG. 8 is provided as an example implementation and variations thereof are contemplated within scope of this disclosure.

In some embodiments, network 800 includes four input nodes, multiple hidden layers, and an output node. Network 800 may be referred to as a deep learning neural network if more than one hidden layer exists. The input nodes are shown to include display brightness 802, relay state 804, CPU temperature 806, and ambient temperature 808. In some embodiments, the display brightness input node 802 is used to model display temperature 364 based on a brightness level of display 110. The relay input node 804 is used to model relay temperature 366 based on an "on/off" state of a power circuit relay in some embodiments. The CPU temperature input node 806 can be used to model CPU temperature 362 based on a reading from a temperature sensor of the CPU. In some embodiments, the ambient temperature input node 808 can be used to model a reading from ambient temperature sensor 323.

In some embodiments, nodes 811, 812, 813, 814, 815 and 816 are included in a hidden layer of network 800. Nodes 811 and 812 may receive input from display brightness input node 802. Node 811 can be used to model a change in display brightness. For example, if the brightness level of display 110 changes from 200 to 50, then the output of node 811 can be reset. Node 812 may be used to model a brightness value (e.g., brightness setting of 250). Similarly, node 813 is shown to receive input from relay state input node 804 and is used to model a change in state of a power circuit relay (i.e., on/off) in some embodiments. Node 814 can be used to model the current state of the relay. Node 815 is shown to receive input from CPU temperature input node 806 and can be used to model a CPU temperature 362. In some embodiments, the input to node 815 involves low-pass filtering designed to create a smooth temperature curve. Node 816 receives input from ambient temperature input node 808 and can be used to model a reading from an ambient temperature sensor such as sensor 323 in some embodiments. The input to node 816 may also involve low-pass filtering.

Nodes 822 and 824 are also included in a hidden layer of network 800 in some embodiments. Node 822 is shown to receive input from nodes 811 and 812 as well as receiving a previous output of node 822 as an input. Similarly, node 824 is shown to receive input from node 813, node 814, and a previous output of node 824. Node 822 can be used to model display temperature 364 since it has knowledge of the current brightness level, changes in brightness level, and previous models of display temperature 364 in some embodiments. Node 824 is used to model relay temperature 366 since it has knowledge of the current state of the relay, changes in the state of the relay, and previous models of relay temperature 366 in some embodiments.

In some embodiments, node 832 is also included in a hidden layer of network 800. Node 832 can be used to model internal temperature 360. As described above with reference to FIG. 5, internal temperature 360 consists of weighted contributions from CPU temperature 362, display temperature 364, and relay temperature 366 in some embodiments. Appropriately, node 832 is shown to receive input from node 822, node 824, and node 815.

Nodes 841, 842, 843, 844, and 845 are also included in a hidden layer of network 800 in some embodiments. Node 841 can be used to model the impact of heat over a casing of thermostat device 100. For example, if device 100 has been active (e.g., not in sleep mode) for an extended period of time, a user may be able to feel excess heat coming from areas such as display 110 and/or processing electronics 120. In some embodiments, ambient temperature sensor 323 of device 100 is located near the casing and thus may be directly impacted by excess heat present at the exterior of the casing. Thus, node 841 is shown to receive input from node 822 as well as node 824. Node 842 can be used to store a modeled value for internal temperature 360 received as input from node 832. Node 843 can be used to model a gradient of internal temperature 360 and receives input from node 832 as well as a previous output of node 843 as input. A slope or derivative calculation is used to quantify a rate and direction of change observed in the model of internal temperature 360 in some embodiments. Node 844 can be used to store a modeled value of ambient temperature obtained from sensor 323 and is shown to receive input from node 816. Node 845 can be used to model a gradient of the ambient temperature reading and is shown to receive input from node 816 as well as receiving a previous output of node 845 as input.

Nodes 852 and 854 may also be included in a hidden layer of network 800. Node 852 can be used to model a current value of actual ambient temperature 370 and is shown to receive input from nodes 842 and 844. As discussed above with reference to FIG. 4, actual ambient temperature 370 may consist of weighted contributions from internal temperature 360 as well as ambient temperature reading 323. Node 854, on the other hand, can be used to model a gradient of temperature 370 and is shown to receive input from nodes 843 and 845.

The output layer of network 800 includes predicted ambient temperature node 862 in some embodiments. Node 862 contains a data-driven prediction of the actual ambient temperature 370 to be used by a thermostat device 100. Node 862 is shown to receive input from nodes 841, 852, and 854. A previous output of node 862 may also be used as input to node 862 or any other nodes within network 800.

The output of network 800 may provide thermostat device 100 with a more accurate prediction of the actual ambient temperature 370 compared to simply basing the prediction on a reading from sensor 323. The error in the prediction of temperature 370 can be reduced over time as network 800 "learns" by processing more and more data. In some embodiments, a model for the output of network 800 is described by the following equation:

$$T_{env} = a*T_{inter} + b*T_{sens} + h*(\Delta T_{inter} - \Delta T_{sens}) + i*T_{lcd} + j*T_{relay} + \text{Bias}$$

As such, the output of network 800 is generally a weighted sum of the ambient temperature reading from sensor 323 and the internal heat index 360 (and various components thereof) in some embodiments. Network 800 can be trained with a time series dataset (e.g., a series of measurements at evenly-spaced time steps) that includes CPU temperature 362, display brightness (temperature) 364, relay state (temperature) 366, ambient temperature 323, and a measurement of the actual ambient temperature obtained using a temperature sensor separate from device 100. This training allows network 800 to recognize the inputs it receives in terms of how they relate to the desired output in some embodiments. This dynamic approach may facilitate improved accuracy over other types of approaches such as rules-based approaches or static modeling approaches.

Different designs of recurrent neural network 800 using similar principles are also contemplated. For example, further deployment, development, and testing of thermostat device 100 may reveal additional components that generate significant amounts of heat and introduce further error in ambient temperature measurement. More or less nodes, hidden layers, and inputs as well as alternative activation functions are contemplated to achieve similar functionality. A recurrent neural network can be an effective tool used to calibrate an ambient temperature sensor of a thermostat or other type of device.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A method for determining an actual ambient temperature value associated with a measured ambient temperature in a building control system, the method comprising:
    obtaining a first temperature measurement from a first temperature sensor of a device, the first temperature sensor configured to sense the measured ambient temperature, wherein heat generated by electronic components of the device affects the measured ambient temperature causing the first temperature measurement to be inaccurate relative to the actual ambient temperature value;
    obtaining a second temperature measurement from a second temperature sensor of the device, the second temperature sensor configured to measure a temperature of a processing circuit of the device;
    determining a brightness level associated with a display of the device;
    determining a state of a relay associated with the device, the state of the relay indicative of a level of electrical energy powering the device;
    providing the first temperature measurement, the second temperature measurement, the brightness level, and the state of the relay as input to a neural network; and
    determining the actual ambient temperature value associated with the measured ambient temperature based on an output of the neural network.

2. The method of claim 1, further comprising training the neural network with a time series dataset comprising the first temperature measurement, the second temperature measurement, the brightness level, the state of the relay, and a measurement of the actual ambient temperature generated by a third temperature sensor that is separate from the device.

3. The method of claim 1, further comprising determining, by the neural network, an internal heat index associated with the device using the second temperature measurement, the brightness level, and the state of the relay, wherein the internal heat index comprises an estimation of the heat generated by the electronic components of the device.

4. The method of claim 3, wherein determining the internal heat index comprises determining a temperature of the display based on the brightness level and an amount of time since the brightness level has changed.

5. The method of claim 4, wherein determining the internal heat index further comprises determining a temperature of the relay based on the state of the relay and an amount of time since the state of the relay has changed.

6. The method of claim 5, wherein the internal heat index comprises a weighted sum of the second temperature measurement, the temperature of the display, and the temperature of the relay.

7. A method for determining an actual ambient temperature value associated with a measured ambient temperature in a building control system, the method comprising:
obtaining a first temperature measurement from a first temperature sensor of a device, the first temperature sensor configured to sense the measured ambient temperature;
obtaining a second temperature measurement from a second temperature sensor of the device, the second temperature sensor configured to measure a temperature of a processing circuit of the device;
determining a brightness level associated with a display of the device;
determining a state of a relay associated with the device, the state of the relay indicative of a level of electrical energy powering the device;
providing the first temperature measurement, the second temperature measurement, the brightness level, and the state of the relay as input to a neural network;
determining the actual ambient temperature value associated with the measured ambient temperature based on an output of the neural network; and
determining, by the neural network, an internal heat index associated with the device using the second temperature measurement, the brightness level, and the state of the relay, wherein the internal heat index comprises an estimation of heat generated by electronic components of the device, wherein the output of the neural network comprises a weighted sum of the first temperature measurement and the internal heat index.

8. The method of claim 1, wherein the neural network comprises a recurrent neural network, and wherein an activation function associated with at least one node in the neural network comprises a hyperbolic tangent function.

9. A device in a building control system, the device comprising:
a first temperature sensor configured to generate a first temperature measurement that is indicative of a measured ambient temperature near the device, wherein heat generated by electronic components of the device affects the measured ambient temperature causing the first temperature measurement to be inaccurate relative to an actual ambient temperature value;
a relay configured to control an amount of electrical energy powering the device;
a display configured to provide a user interface to a user of the device; and
a processing circuit comprising a second temperature sensor configured to generate a second temperature measurement that is indicative of a temperature of the processing circuit, the processing circuit configured to:
obtain the first temperature measurement from the first temperature sensor;
obtain the second temperature measurement from the second temperature sensor;
determine a brightness level associated with the display;
determine a state of the relay;
provide the first temperature measurement, the second temperature measurement, the brightness level, and the state of the relay as input to a neural network; and
determine the actual ambient temperature value associated with the measured ambient temperature near the device based on an output of the neural network.

10. The device of claim 9, wherein the neural network is trained with a time series dataset comprising the first temperature measurement, the second temperature measurement, the brightness level, the state of the relay, and a measurement of the actual ambient temperature generated by a third temperature sensor that is separate from the device.

11. The device of claim 9, wherein the neural network is configured to determine an internal heat index associated with the device using the second temperature measurement, the brightness level, and the state of the relay, wherein the internal heat index comprises an estimation of heat generated by electronic components of the device.

12. The device of claim 11, wherein the neural network is configured to determine a temperature of the display based on the brightness level and an amount of time since the brightness level has changed.

13. The device of claim 12, wherein the neural network is configured to determine a temperature of the relay based on the state of the relay and an amount of time since the state of the relay has changed.

14. The device of claim 13, wherein the internal heat index comprises a weighted sum of the second temperature measurement, the temperature of the display, and the temperature of the relay.

15. The device of claim 11, wherein the output of the neural network comprises a weighted sum of the first temperature measurement and the internal heat index.

16. The device of claim 9, wherein the neural network comprises a recurrent neural network and an activation function associated with at least one node in the neural network comprises a hyperbolic tangent function.

17. A method for determining an actual ambient temperature value in a building control system, the method comprising:
obtaining a first temperature measurement from a first temperature sensor of a device, the first temperature sensor configured to measure a measured ambient temperature, wherein heat generated by electronic components of the device affects the measured ambient temperature causing the first temperature measurement to be inaccurate relative to the actual ambient temperature value;
obtaining a second temperature measurement from a second temperature sensor of the device, the second temperature sensor configured to measure a temperature of a processing circuit of the device;
determining a brightness level associated with a display of the device;
providing the first temperature measurement, the second temperature measurement, and the brightness level as input to a neural network; and
determining the actual ambient temperature value associated with the measured ambient temperature based on an output of the neural network.

18. The method of claim 17, further comprising training the neural network with a time series dataset comprising the first temperature measurement, the second temperature measurement, the brightness level, and a measurement of the measured ambient temperature generated by a third temperature sensor that is separate from the device.

19. The method of claim 17, further comprising determining, by the neural network, an internal heat index associated with the device using the second temperature measurement and the brightness level, wherein the internal heat index comprises an estimation of heat generated by electronic components of the device.

20. The method of claim 19, wherein the output of the neural network comprises a weighted sum of the first temperature measurement and the internal heat index.

* * * * *